United States Patent [19]

Oana et al.

[11] Patent Number: 5,719,668
[45] Date of Patent: Feb. 17, 1998

[54] LENS-METER FOR MEASURING OPTICAL CHARACTERISTICS OF OPTICAL LENS

[75] Inventors: Yoshinori Oana; Eiichi Yanagi, both of Tokyo, Japan

[73] Assignee: Kabushiki Kaisha TOPCON, Tokyo, Japan

[21] Appl. No.: 697,171

[22] Filed: Aug. 20, 1996

Related U.S. Application Data

[63] Continuation of Ser. No. 478,094, Jun. 7, 1995, abandoned, which is a continuation of Ser. No. 200,966, Feb. 24, 1994, abandoned.

[30] Foreign Application Priority Data

Feb. 26, 1993 [JP] Japan .................................. 5-038200

[51] Int. Cl.$^6$ ........................................... G01B 9/00
[52] U.S. Cl. ................................... 356/124; 356/127
[58] Field of Search ............................... 356/124, 125, 356/126, 127

[56] References Cited

U.S. PATENT DOCUMENTS

| | | | |
|---|---|---|---|
| 4,410,268 | 10/1983 | Tamaki | 356/125 |
| 4,601,575 | 7/1986 | Tamaki | 356/125 |
| 4,730,924 | 3/1988 | Allard et al. | 356/124 |
| 5,173,739 | 12/1992 | Kurachi et al. | 356/124 |
| 5,175,594 | 12/1992 | Campbell | 356/124 |
| 5,303,022 | 4/1994 | Humphrey et al. | 356/124 |
| 5,307,141 | 4/1994 | Fujieda | 356/124 |

Primary Examiner—Hoa Q. Pham
Attorney, Agent, or Firm—Armstrong, Westerman, Hattori, McLeland & Naughton

[57] ABSTRACT

A lens meter in which light from a measurement light source is passed though a lens to be measured into a photoelectric conversion element so as to find optical characteristics of the lens to be measured based on photoelectric conversion signals from the photoelectric conversion element. The measurement light source is capable of emitting at least two rays of light having different wavelengths. The lens meter includes computing device for calculating optical characteristics of the lens to be measured based on photoelectric conversion signals from the photoelectric conversion element in response to the two rays of light having different wavelengths. This configuration ensures an accurate measurement of optical characteristics of the lens to be measured whole optical characteristics are unknown.

3 Claims, 12 Drawing Sheets

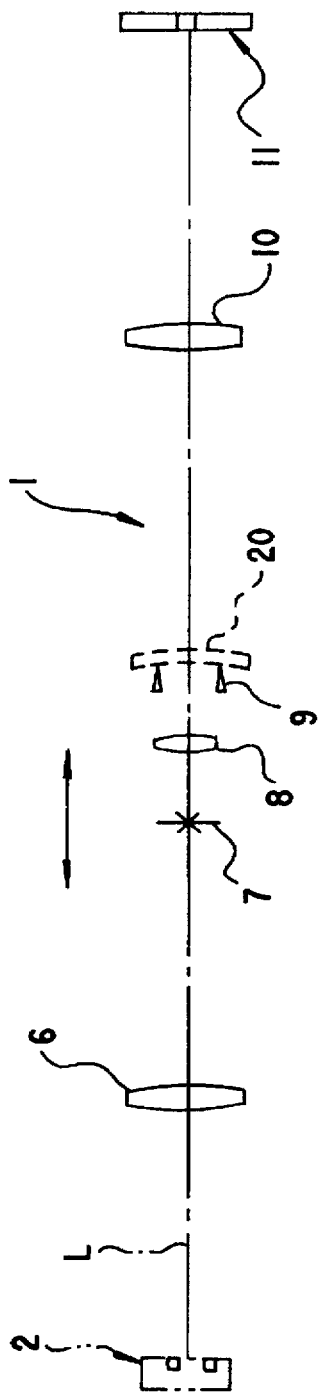
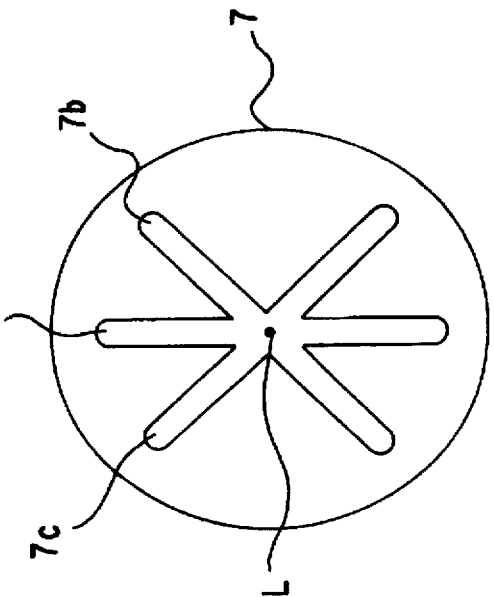
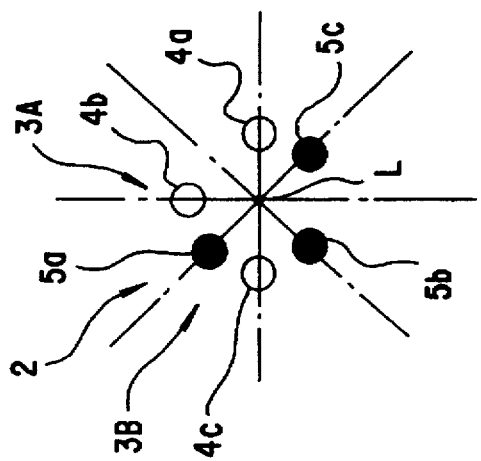

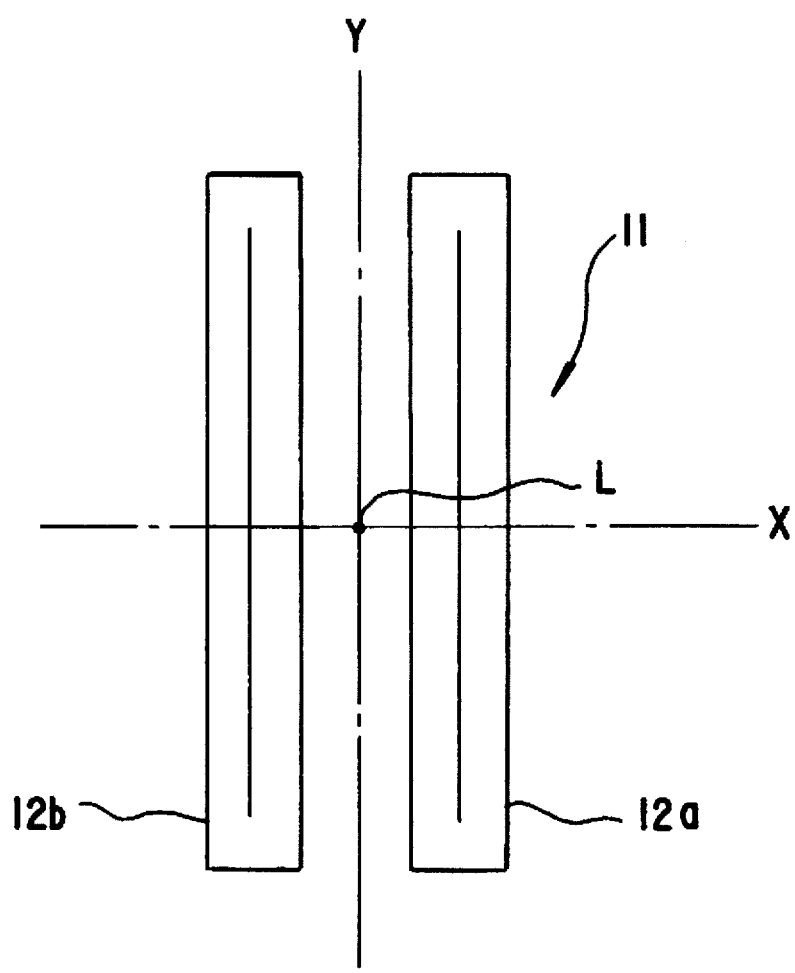

LENS-METER FOR MEASURING OPTICAL CHARACTERISTICS OF OPTICAL LENS

This application is a continuation of application Ser. No. 08/478,094, filed Jun. 7, 1995, now abandoned, which is a continuation of application Ser. No. 08/200,966, filed Feb. 24, 1994, now abandoned.

BACKGROUND OF THE INVENTION

1. Field of the Invention

The present invention relates to a lens-meter for measuring optical characteristics of various optical lenses such as a specific lens and contact lens.

2. Description of the Related Art

Typical optical lenses have an optical characteristic termed dispersion in which the dispersion differs depending on the wavelengths of the incident ray of light. As a spectacle lens which is a lens to be measured there was mainly used in the past a crown glass having Abbe numeral (=reciprocal of the dispersion) $\nu_d$=58 to 60 at d line (587.56 nm), but recently there has been often used a highly dispersed glass of a high refractive index (for example, $\nu_d$=30 to 40). A plastic lens having a high dispersion (for example, d=34 to 40) is also becoming popular.

In the convention manual lens-meter, the wavelength of the measurement optical source is green and hence there will arise no problem as long as the refraction characteristics of the lens to be measured are measured by use of this measurement light source.

In the so-called auto-lens-meter for automatically measuring dioptric power, there has been no suitable light detector capable of detecting at satisfactory sensitivity the light of wavelength presenting green or for the measurement light source strongly emitting the green light, and accordingly the light source emitting a light having a longer wavelength (for example, 660 nm or 730 nm) than the wavelength presenting green is used. This will contribute to the problem that the measurement value may involve an error of the order of several % depending on the difference of dispersion.

In order to solve the above problem, Japanese Utility Model Publication No. 3-48512 proposes an apparatus for automatically measuring the lens dioptric power in which the data on Abbe number $\nu_d$ of the lens to be measured are input so as to correct the measurement value. However, the above apparatus for automatically measuring the lens dioptic power entails a problem that the correction is not to be done unless the Abbe number $\nu_d$ is known.

More specifically, before machining, or edged lens, or at the time of point when the spectacles are delivered to the person to be measured, Abbe number d is usually apparent, but the Abbe number $\nu_d$ is often unknown of the ones in use after the delivery to the person to be measured. It is difficult for the above apparatus to automatically measure the lens dioptric power to deal with such lens to be measured.

SUMMARY OF THE INVENTION

It is therefore an object of the present invention to provide a lens-meter ensuring an accurate measurement of optical characteristics of the lens to be measured whose optical characteristics are unknown as well.

According to the first aspect of the invention, there is provided a lens-meter in which light from a measurement light source is passed through a lens to be measured into a photoelectric conversion means so as to find optical characteristics of the lens to be measured based on photoelectric conversion signals from the photoelectric conversion means. The measurement light source is capable of emitting at least two rays of light having different wavelengths. The lens-meter includes a computing means for calculating optical characteristics of the lens to be measured based on photoelectric conversion signals from the photoelectric conversion means in response to the at least two rays of light having different wavelengths.

Preferably, the measurement light source includes at least two light emitting sections located separate and apart from each other and adapted to separately send light having different wavelengths to the lens to be measured by way of light selective transmission means arranged on a measurement optical axis.

Preferably, the photoelectric conversion means includes, on optical paths diverged by wavelength selection means arranged on a measurement optical axis, a plurality of photoelectric conversion sections corresponding to respective optical paths.

Preferably, the measurement light source includes a single light emitting section, and a filter section replaceably arranged on the light path between the light emitting section and the lens to be measured and rendering light from the light emitting section into two rays of light having different wavelengths.

According to a second aspect of the present invention, there is provided a lens-meter in which light from a measurement light source is passed through a lens to be measured into a photoelectric conversion means so as to find optical characteristics of the lens to be measured based on photoelectric conversion signals from the photoelectric conversion means and in which a mode switching section is provided to switch a measurement mode between a normal lens measurement mode and a progressive lens measurement mode. The measurement light source is capable of emitting a plurality of rays of light having different wavelengths. The lens-meter includes a computing means for calculating optical characteristics of the progressive lens with dispersion-based correction in compliance with photoelectric conversion signals from the photoelectric conversion means in response to the rays of light having different wavelengths from the measurement light source when setting the progressive lens measurement mode by the mode switching section to measure a distance portion of the progressive lens.

According to a third aspect of the present invention, there is provided a lens-meter in which light from a measurement light source is passed through a lens to be measured into a photoelectric conversion means so as to find optical characteristics of the lens to be measured based on photoelectric conversion signals from the photoelectric conversion means and in which there are provided a mode switching section to switch a measurement mode between a normal lens measurement mode and a progressive lens measurement mode and an add power measurement key of a progressive lens. The measurement light source being capable of emitting a plurality of rays of light having different wavelengths. The lens-meter includes computing means for calculating optical characteristics of the progressive lens with dispersion-based correction in compliance with photoelectric conversion signals from the photoelectric conversion means in response to the rays of light having different wavelengths from the measurement light source when setting the measurement mode into the normal lens measurement mode to measure distance portion of the progressive lens and depressing the addition power measurement key to displace the progressive lens to measure its nearsighted portion.

According to the fourth aspect of the present invention, there is provided a lens-meter in which light from a measurement light source is passed through a lens to be measured into a photoelectric conversion means so as to find optical characteristics of the lens to be measured based on photoelectric conversion signals from the photoelectric conversion means and in which there are provided a mode switching section to switch a measurement mode between a normal lens measurement mode and a progressive lens measurement mode and a marking mechanism for conferring a mark onto the lens to be measured. The measurement light source is capable of emitting a plurality of rays of light having different wavelengths. The lens-meter includes computing means for calculating optical characteristics of the progressive lens with dispersion-based correction of distance and nearsighted portions in compliance with photoelectric conversion signals from the photoelectric conversion means in response to the rays of light having different wavelengths from the measurement light source when setting the progressive lens measurement mode by the mode-switching section to measure distance and nearsighted portions of the progressive lens and conferring a mark onto the progressive lens by the marking mechanism.

BRIEF DESCRIPTION OF THE DRAWINGS

FIG. 2 depicts an optical arrangement in a first embodiment of the lens-meter of the present invention;

FIG. 3 depicts an arrangement of a measurement light source in the first embodiment;

FIG. 4 is a top plan view of a target in the first embodiment;

FIG. 5 is a top plan view of a photoelectric conversion means in the first embodiment;

DESCRIPTION OF THE PREFERRED EMBODIMENT

A principle of measurement of the present invention will now be described.

The principle of two-wavelength measurement is as follows.

Let a lens 20 to be measured, which will be described later, be a thin lens r1 and r2 radii of curvature of the front and back faces, respectively, of the lens 20 to be measured, $D_\lambda$ a refracting power of the lens 20 to be measured at any arbitrary measuring wavelength $\lambda$, and $n_\lambda$ a refractive index at the measuring wavelength 80 a formula of the lens then gives $$D_\lambda = (n_\lambda - 1)(1/r1 - 1/r2) \tag{1}$$

Provided Dx and nx represent a refracting power and a refractive index, respectively, at a desired wavelength, there results $$Dx = (nx - 1)(1/r1 - 1/r2) \tag{2}$$

(1) and (2) lead to $$Dx = \{(nx-1)/(n_\lambda 311)\}D_\lambda \equiv \{1+(nx-n_\lambda)/(nx-1)\}D_\lambda \tag{3}$$

Now, if $_v'$ denotes a relative partial dispersion, the $$_v' = (nx - n_\lambda)/(n_{10\tau} - n_{\omega'}) \tag{4}$$

(where $n_\omega$, $n_\omega'$ designate refractive indices at wavelengths $\omega$, $\omega'$, respectively)

In the case of using a spectacle lens as a lens to be measured, the $_{98}'$ is often substantially proportionally associated with an Abbe number $_v x$.

Therefore with a, b constant, (4) can be expressed as $$_v' = (nx-n_\lambda)/(n_\omega - n_\omega') = a\,_v x + b \tag{5}$$

Since $$_v = (nx-1)/(n_\omega - n_\omega') \tag{6}$$

(3) leads, based on (5) and (6), to $$Dx = (1 + a + b_v/x)D_\lambda \tag{7}$$

On the other hand, let $n_\lambda'$ be a dispersion at another measuring wavelength $\lambda'$, there is obtained $$D_\lambda' = (n_\lambda' - 1)(1/r1 - 1/r2) \tag{8}$$

Similarly, with c, d constant, $$Dx = (1 + c + d/_v x)D_\lambda' \tag{9}$$

Since the constant a, b, c, d is a predetermined coefficient, the expression (7) and (9) yield a refracting power Dx and an Abbe number $\nu x$ at a desired wavelength through the measurement of the refracting power $D_\lambda$, $d_\lambda'$ by use of any two wavelengths.

Description will now be given of a principle of measurement using three or more different wavelengths.

Figure 1:
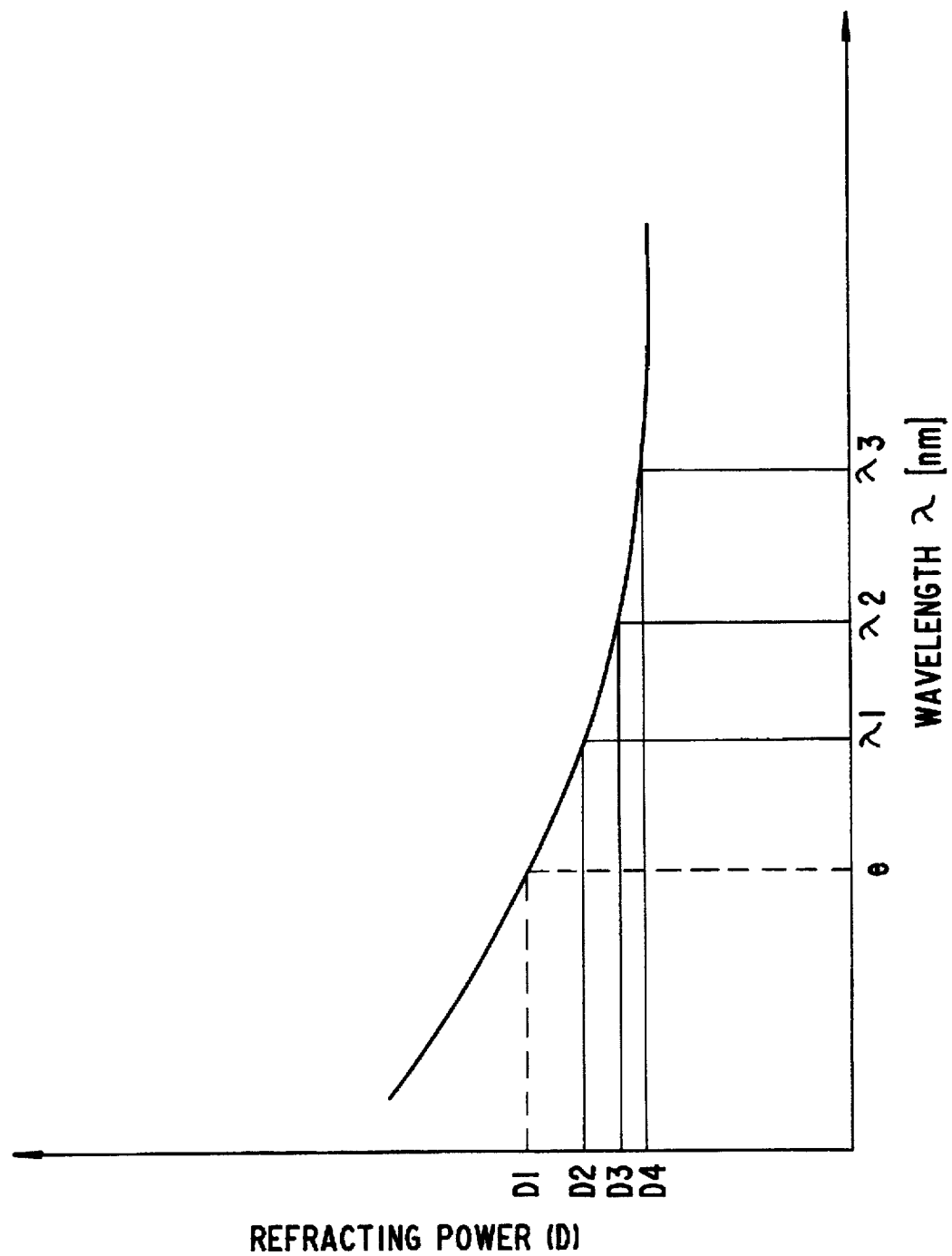
FIG. 1 is a graph showing the relationship between measurement wavelengths and refracting powers, illustrating the principle of measurement in a lens-meter in accordance with the present invention.

The following is the case where a measurement value with n-wavelengths (n≧3) is approximated by use of least squares method to a quadratic, based on which there is found a refracting power of the lens to be measured at a desired wavelength (for example, beam e in FIG. 1).

The measurement is done by using at least three different wavelengths of luminous flux as shown in FIG. 1. Let D1, D2, D3 . . . be a refracting power (power) at respective wavelengths ($\lambda 1$, $\lambda 2$, $\lambda 3$, . . . ), the results are $$Di = a + b\lambda i + c\lambda i^2 \tag{10}$$

$$\Sigma(D) = na + b\Sigma(\lambda) + c\Sigma(\lambda^2) \tag{11}$$

$$\Sigma(d\lambda) = a\Sigma(\lambda) + b\Sigma(\lambda^2) + c\Sigma(\lambda^3) \tag{12}$$

$$\Sigma(D\lambda^2) = a\Sigma(\lambda^2) + b\Sigma(\lambda^3) + c(\lambda^4) \tag{13}$$

Thus, since there exist three equations for three unknown values a, b, and c, they can be solved as ternary simultaneous equations to obtain an expression defining the dotted line of FIG. 1 in the form of (10).

For example, if $\lambda i$ is a wavelength designated by the beam e, substitution into thus obtained expression gives Di which represents a refracting power (power) of the beam e.

If dispersion correction value δ per 1D to be stored is a value obtained by dividing a difference (D2−Di) between a refracting power (D2) at a dominant wavelength (for example, $\lambda 2$) used in measurement and refracting power (Di) by the refracting power (D2), and D2' is a measured refracting power at the dominant wavelength, then a refracting power Di' at a desired wavelength is equivalent to the value obtained by adding $_\delta$D2' to D2' from (14).

$$Di' = D2' + _\delta D2' \tag{14}$$

A first embodiment of the present invention based on the above principle of measurement will now be described in detail.

Referring first to FIG. 2, there is shown a lens-meter generally designated at 1 and comprising a measurement light source 2 including two types of light emitting sections 3A and 3B which are circumferentially arranged around a measurement optical axis L of the lens-meter 1 and which emit light of different wavelengths. The lens-meter 2 further comprises an objective lens 5, a target 7, a collimating lens 8, and lens strap 9, and image forming lens 10 and a photoelectric conversion means 11, which are aligned along the measurement optical axis L in the mentioned order.

In the measurement light source 2, as is apparent from FIG. 3, the light emitting section 3A consists of three LED's 4a, 4b and 4c (represented by white circles in FIG. 3) which emit light of measurement wavelength $\lambda 1 = 660$ nm and are arranged around the measurement optical axis L at intervals of 90 degrees so as to be orthogonal to the axis L, while the light emitting section 3B consists of three LED's 5a, 5b and 5c (represented by black circles in FIG. 3) which emit light of measurement wavelength $\lambda 2 = 735$ nm and are arranged around the measurement optical axis L at intervals of 90 degrees so as to be orthogonal to the axis L.

The use of wavelengths of 660 nm and 735 nm for the LED's 4a, 4b, 4c and the LED's 5a, 5b, 5c, respectively, is attributable to the following means.

As can be seen in Table 1, various LED's (light emitting diodes) having wavelengths lying within the visible light region are often expressed in terms of photometric quantities (luminous intensity). Although in recent years a green LED is not very inferior in luminous intensity value itself to a red LED, actually the sensitivity of human eyes is different by more than one digit. Thus, irrespective of the same apparent brightness, the output of the green LED is considerably lower than that of the red LED.

On the contrary, the sensitivity of a CCD (charge coupled device) acting as the photoelectric conversion means also has its peak in green, but a relatively wider foot of distribution than the human eyes unless it is a photometric sensor in particular. Consequently, there is little difference in sensitively between the green LED and the red LED, which allows a difference in radiant intensity to reflect substantially intact.

The use of the LED having a wavelength of 800 nm or more is undesirable since a ray of light with such wavelength is not permitted to penetrate the lens 20 to be measured as in the case of a lens used for sunglasses. Eventually, it is preferable to use a red LED and near-infrared LED whose radiant intensity and CCD relative sensitivity level are both large.

In table 1, a CCD sensitivity marked with a single asterisk represents a sensitivity of a general black-and-white CCD for visible light, normalized by a sensitivity at a sensitivity peak wavelength (550 nm). The CCD relative sensitivity level marked with two asterisks is obtained by normalizing the product of the radiant intensity and the CCD sensitivity at respective wavelengths by a value of 660 nm.

TABLE 1

| | LED OUTPUTS OF DIFFERENT WAVELENGTHS (MOLDED LENS TYPE) | | | | | |
|---|---|---|---|---|---|---|
| COLOR | WAVE-LENGTH | LUMINOUS INTENSITY (nm) | SPECTRAL LUMINOUS EFFICIENCY (mcd) | RADIANT INTENSITY (mW/sr) | CCD SENSITIVITY | CCD RELATIVE SENSITIVITY LEVEL |
| NEAR-INFRARED | 735 | | 0 | 100 | 0.63 | 1.0 |
| RED | 660 | 3000 | 0.061 | 72 | 0.87 | 1.0 |
| ORANGE | 620 | 3000 | 0.381 | 11.5 | 0.95 | 0.17 |
| YELLOW | 590 | 3000 | 0.757 | 5.8 | 0.98 | 0.09 |
| GREEN | 570 | 1000 | 0.952 | 1.5 | 0.99 | 0.02 |
| BLUE | 470 | 12 | 0.091 | 0.2 | 0.91 | 0.002 |

Referring again to FIG. 3, the LED 5a of the light emitting section 3B is interposed between the LED 4b and LED 4c of the light emitting section 3A so as to form a 45 degree angle thereto. As a result, the LED 5b of the light emitting section 3B is at a 45 degree angle to the LED 4c of the light emitting section 3A, and the LED 5c is at a 45 degree angle to the LED 4a of the light emitting section 3A.

The measurement light source 2 is disposed at a focal point of the objective lens 6. The target 7 is placed at a focal point of the collimating lens 8. The photoelectric conversion means 11 is positioned at a focal point of the image forming lens 10.

Figure 6:
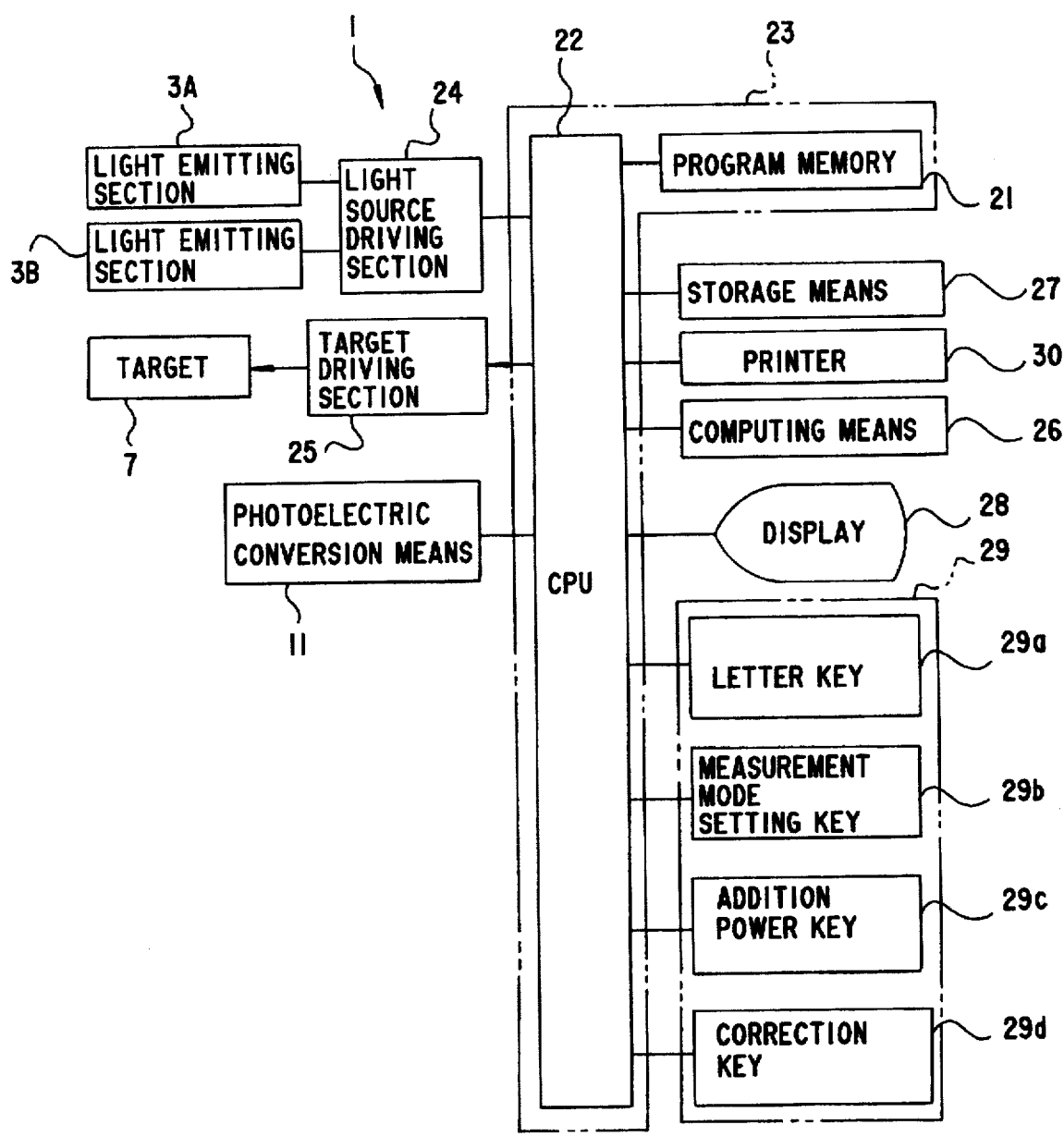
FIG. 6 is a block diagram showing a control system of the first embodiment.

The target 7 is driven by a target driving section 25 depicted in FIG. 6 so as to be displaceable in the direction of the measurement optical axis L with the aid of a servo control. As depicted in FIG. 4, the target 7 is in the form of a disk including a vertically elongated hole 7a around the measurement optical axis L, and a pair of diagonally elongated holes 7b and 7c around the measurement optical axis L.

The photoelectric conversion means 11, as shown in FIG. 5 where X-axis and Y-axis are orthongonal to the measurement optical axis L, includes a pair of area CCD's 12a and 12b extending parallel with each other so as to extend perpendicularly to the X-axis and parallel with the Y-axis. The photoelectric conversion means 11 executes at time division an optical-electrical conversion of light having measurement wavelengths $\lambda 1=660$ nm and $\lambda 2=735$ nm originating from the light emitting sections 3A and 3B, respectively, and passing through the lens 20 to be measured retained by the lens strap 9, and issues a photoelectric conversion signal.

In this case, the photoelectric conversion means 11 shown in FIG. 5 may be substituted by a single color CCD sensitively separable to light having measurement wavelengths 1=660 nm and 2=735 nm for the execution of optical-electrical conversion and issue of the photoelectric conversion signal.

Turning next to FIG. 5, a control system of the lens-meter 1 will be described.

The lens-meter 1 comprises a control means 23 including a program memory 21 for storing control programs and a CPU (control processing unit) 22. To the CPU 22 there are electrically connected a light source driving section 24 for the drive of the light emitting section 3A and 3B, a target driving section 25 for the drive of the target 7, and the photoelectric conversion means 11.

The CPU 22 is further coupled to a computing means 26, a storage means 27 for storing results of the computing means 26, a display means 28 such as a liquid crystal display (LCD) or a color CRT (cathode ray tube), an input means for the input of various information, and a printer 30 for printing out the results of the computing means 26 as well as a variety of messages. Based on the photoelectric conversion signal derived from the photoelectric conversion means 11 in response to the light having different wavelengths from the two types of light emitting sections 3A and 3B, the computing means 26 executes an operation of optical characteristics including a refracting power and Abbe number of the lens 20 to be measured, with a correction employing the above-described principle on the basis of dispersion of the lens 20 and other elements.

The input means 20 includes a letter key 29a for inputting the value of an arbitrary wavelength, the name of a ray of light designated as beam d, beam e, etc., a measurement mode setting key 29b for separately setting measurement modes for a normal lens and a progressive lens, an add power key 29c for measuring the add power of the progressive lens, and a correction key 29d which issues a correction command based on the dispersion of the lens 20 to be measured and other elements.

A function of thus configured lens-meter 1 will next be described.

Under the control of the CPU 22, the light source driving section 24 switches the two types of light emitting section 3A and 3B on and off in a time division manner, for example, alternately. This allows alternate passage of light having wavelength $\lambda 1=660$ nm and light having wavelength $\lambda 2=735$ nm from the light emitting sections 3A and 3B, respectively, through the lens 20 to be measured retained by the lens strap 9, with a refraction in accordance with the refractive index n1, n2, so as to form an image through the image forming lens 10 on a light-receiving surface of the area CCD 12a or 12b at a position in compliance with the refractive index n1, n2. Then, the area CCD 12a or 12b issues a photoelectric conversion signal in accordance with the dispersion n1, n2 to the CPU 22.

The computing means 26 receives the photoelectric conversion signal in accordance with the refractive index n1, n2 under the control of the CPU 22 to execute operations based on the expressions (8), (7) and 9) to calculate the refractive power D1, D2 corresponding to the measurement wavelength $_\nu x$ including a dispersion of the lens 20 to be measured at a desired wavelength x (for example, beam e). Under the control of the CPU 22, thus calculated refracting power Dx and Abbe number $_\nu x$ at the wavelength x are stored within the storage means 27, and are, if necessary, displayed on the display means 28 and printed out by the printer 30.

By finding and storing the refracting power Dx and Abbe number $_\nu x$ at the desired wavelength x, it is possible in the case of the lens 20 to be measured which will be subsequently retained by the lens strap 9 to find a refracting power by the computing means 26 while switching on only the light emitting section 3A and further to correct thus obtained refracting power through the computing means 26 by a value of the refracting number being stored within the storage means 27, thereby establishing an accurate refracting power Dx and Abbe number $_\nu x$ of the present lens 20 to be measured, which may be displayed on the screen of the display means 28 or printed out by the printer 30. This allows an accurate refracting power Dx and Abbe number $_\nu x$ to be found also in the case of the lens 20 whose refracting power Dx and Abbe number $_\nu x$ are already known.

Such action eliminated the need to switch on both the light emitting sections 3A and 3B each time the lens 20 is measured, which will lead to a reduction in time required for the measurement.

Upon measuring the lens 20 to be measured, the input of a variety of information including the value of an arbitrary wavelength, the name of ray of light such as beam d or beam c, and data on dispersion correction command by way of the input means 29 enables the refracting power Dx and Abbe number $_\nu x$ corresponding to the arbitrary wavelength, the beam d, c, etc., to be calculated and displayed.

Figure 9:
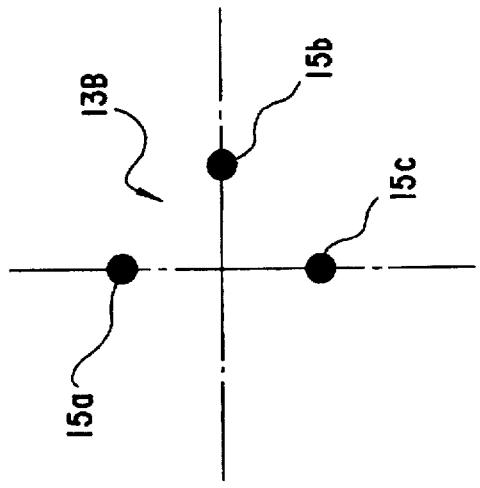
FIG. 9 depicts an arrangement of another measurement light source in the second embodiment.

A second embodiment of the present invention will now be described with reference to FIGS. 7 to 9.

Figure 7:
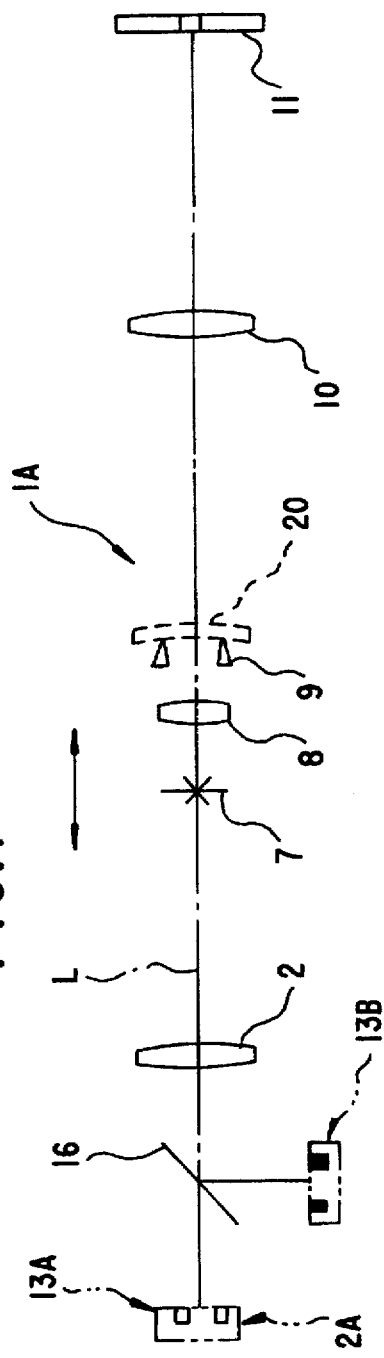
FIG. 7 depicts an optical arrangement of a second embodiment of a lens-meter in accordance with the present invention.

It is to be noted in a lens-meter 1A shown in FIG. 7 that elements having the same functions as those of the lens-meter 1 are designated by the same reference numerals.

The lens-meter 1A as depicted in FIG. 7 comprises a measurement light source 2A consisting of a couple of light source sections 13A and 13B, in lieu of the above-described measurement light source 2. The light source section 13A confronts the measurement optical axis L, while the light source section 13B is orthogonal to the measurement optical axis L. The lens-meter 1A further comprises a dichroic mirror 16 (or a half mirror) arranged at an inclined angle of 45 degrees with respect to the measurement optical axis L and serving as a wavelength selection means designed to permit a passage therethrough of light 66 nm in wavelength and to reflect light 735 nm in wavelength. The rays of light from the light source section 13A and 13B are subjected through the dichroic mirror 16 to measurement.

Figure 8:
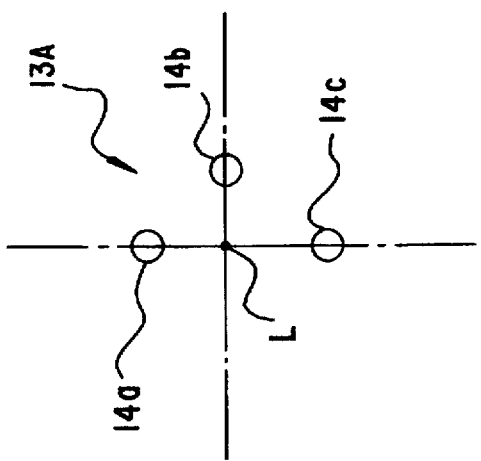
FIG. 8 depicts an arrangement of a measurement light source in the second embodiment.

As can be seen in FIG. 8, the light source section 13A on one hand includes three LED's 14a, 14b, and 14c (represented by white circles in FIG. 8) emitting light of measurement wavelength $_\lambda 1 \times 660$ nm and arranged so as to be orthogonal to the measurement optical axis L. As is clear from FIG. 9, the optical light source section 13B on the other hand includes three LED's 15a, 15b, and 15c (represented by black circles in FIG. 8) emitting light of wavelength $_\lambda 2=735$ nm and facing the dichroic mirror 16.

Thus configured, lens-meter 1A ensured the same function as in the above described lens-meter 1 by the alternate flush of the optical light section 13A and 13B. Moreover, the optical coincidence in the positions of light sources for different colors can simplify the calculation of power and the arithmetic expression for carrying out the comparison, as compared with the case shown in FIG. 3.

Figure 10:
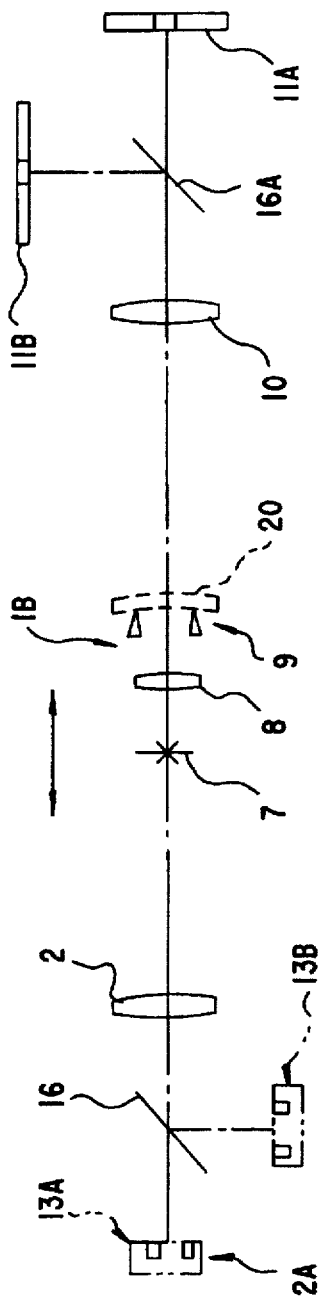
FIG. 10 depicts an optical arrangement of a third embodiment of a lens-meter in accordance with the present invention.

Referring next to FIG. 10, there will be described a third embodiment of the present invention.

It is to be understood in a lens-meter 1B depicted in FIG. 10 that elements having the same functions as those in the above-described lens-meter 1A are referenced by the same numerals.

The lens-meter 1B shown in FIG. 10 has substantially the same configuration as that of the lens-meter 1A described above, except that the photoelectric conversion means 11 is substituted by the combination of a dichroic mirror 16A (or a half mirror) and a couple of photoelectric conversion means 11A and 11B each forming 90 degrees to the other around the dichroic mirror 16A. The dichroic mirror 16A serves as a wavelength selection means arranged on the measurement optical axis L behind the lens 20 to be measured and at an inclined angle of 45 degrees to the optical axis L and designed to transmit 660 nm light 660 and reflect 735 nm light.

Although the production costs of thus configured lens-meter 1B are raised due to the addition of the light source section 13B, the dichroic mirrors 16 16A and the photoelectric conversion means 11B, the simultaneous lighting of the pair of light emitting sections 13A and 13B and therefore the divergence of the light from the light source sections 13A and 13B by the dichroic mirror 16A to direct to the corresponding photoelectric conversion means 11A, 11B will eliminate the need to alternately turn on the light source sections 13A and 13B, which results in a reduction of the time required for measuring the lens 20 to be measured.

Figure 11:
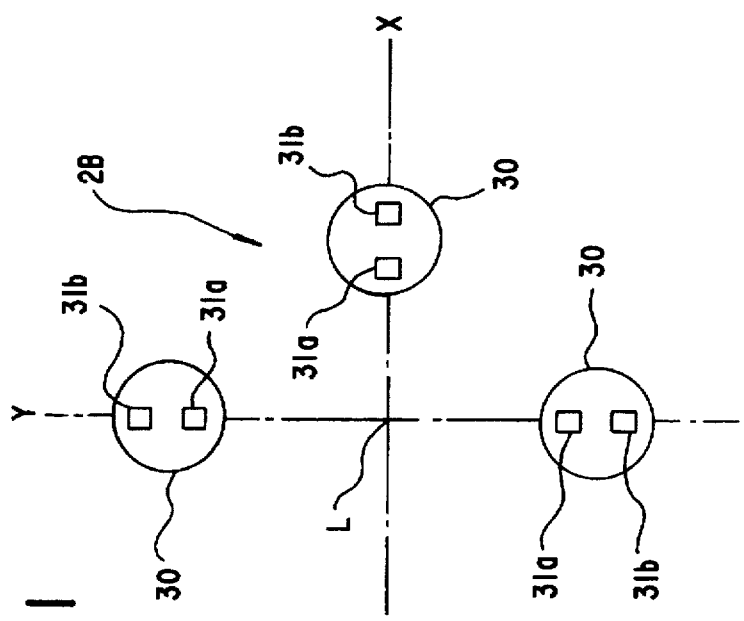
FIG. 11 depicts an arrangement of another example of the measurement light source.

FIG. 11 illustrates a variant of the measurement light source 2 described above, in which a measurement light source 2B consists of three LED elements 30 of two-color emitting type each arranged to form 90 degrees to the adjacent one around the measurement optical axis L.

Figure 12:
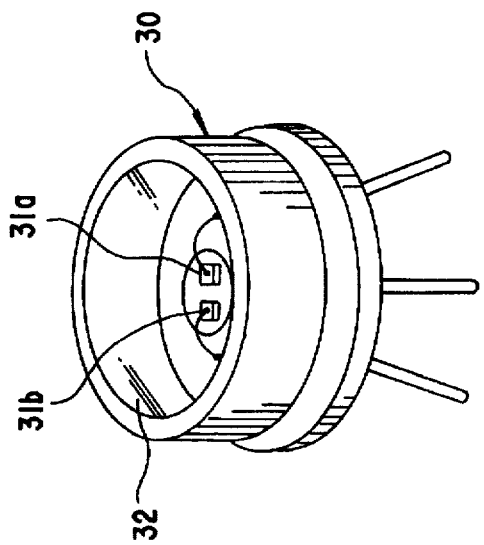
FIG. 12 is a perspective view of an LED element of two-color emitting type in another example of the measurement light source.

More specifically, the LED element 30, as is apparent from FIG. 12, has a three-terminal structure including a resin molded lens 32, a first LED 31a emitting 660 nm light, and a second LED 31b emitting 735 nm light located in close proximity to the first LED 31a, both LED's being received within the molded lens 32. The arrangement of three such LED elements 30 as shown in FIG. 11 simplifies the structure as compared with the case of the measurement light source 2 described above.

Figure 13:
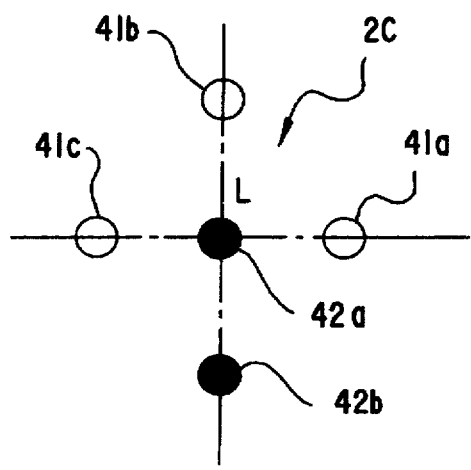
FIG. 13 depicts an arrangement of further example of the measurement light source.

FIG. 13 illustrates another example of the measurement light source 2, in which a measurement light source 2C includes at least three LED's for measuring the power (for example, 660 nm in wavelength) and at least two LED's for correcting the dispersion (for example, 735 nm). More specifically, three LED's 41a, 41b, and 41c (represented by white circles) emitting light, for example, 660 nm in wavelength are equidistant from the measurement optical axis L and arranged separately to form a right angle to the adjacent one(s) around the axis L. Of two LED's 42a and 42b (represented by black circles) emitting light, for example 735 nm in wavelength, one LED 42a confronts the measurement optical axis L while the other LED 42b and the LED 41b are arranged symmetrically with respect to the optical axis L.

Figure 15:
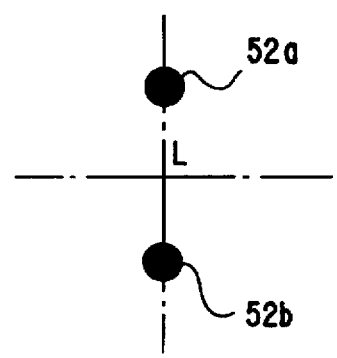
FIG. 15 depicts an arrangement of LED's for dispersion correction in the measurement light source shown in FIG. 13.
Figure 14:
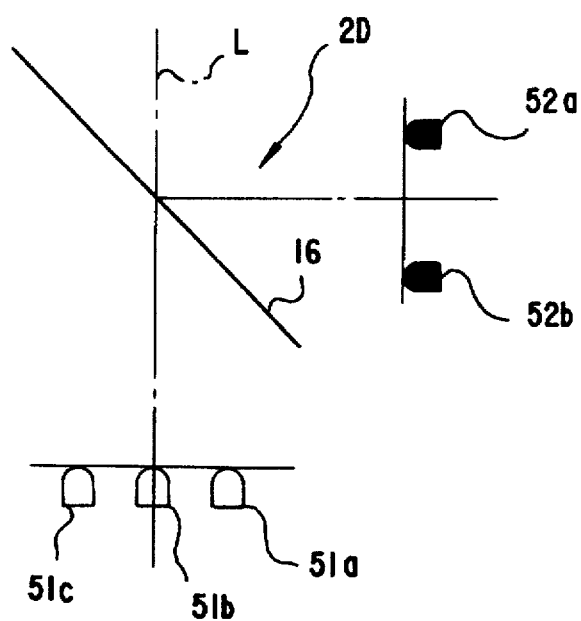
FIG. 14 depicts an arrangement of still further example of the measurement light source.
Figure 16:
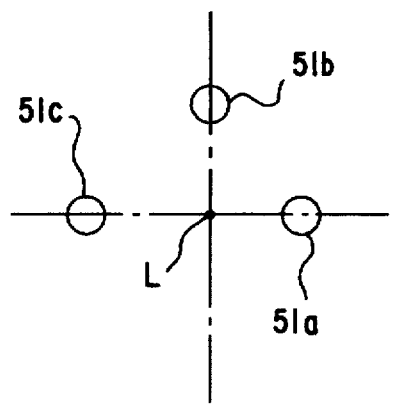
FIG. 16 depicts an arrangement of LED's for power measurement in the measurement light source shown in FIG. 13.

FIG. 14 depicts a still another example of the measurement optical source 2, in which a measurement optical source 2D includes three LED's 51a, 51b, 51c (represented by white circles) emitting light, for example, 660 nm in wavelength and two LED's 52a, 52b (represented by black circles) emitting light, for example, 735 nm in wavelength. More specifically, the LED's 51a, 51b and 51c are equidistant from the measurement optical axis L and arranged separately to form a right angle to adjacent one(s) around the optical axis L, as shown in FIG. 16 as well, while the LED's 52a and 51c, as shown in FIG. 15 as well.

A detailed description will now be given of action correction the optical characteristics by means of the lens-meter 1C incorporating the measurement light source 2C.

Figure 17:
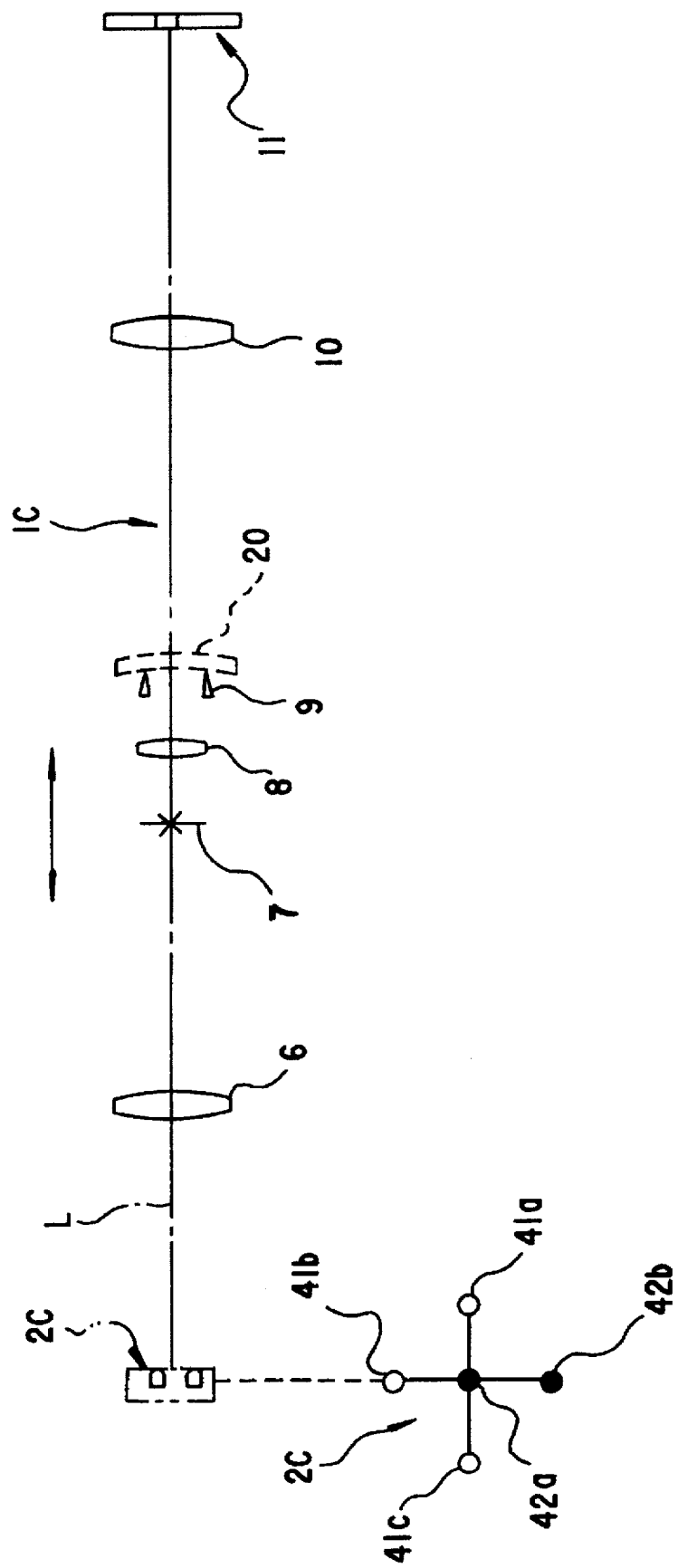
FIG. 17 depicts an optical arrangement of a lens-meter employing the measurement light source shown in FIG. 13.

Referring to FIG. 17, there are shown LED's 41, 41b, 41c (represented by white circles) acting as a measurement light source emitting visible light (550 nm in wavelength) and LED's 42a, 42b (represented by black circles) acting as a measurement light source emitting near-infrared light (735 nm in wavelength). It will be appreciated that the above configuration may be reversed and that the combinations of visible light/visible light or near-infrared light/near-infrared light is also available as long as there is a degree of difference in wavelength between two emitted rays of light.

In the case of this lens-meter 1C there can be obtained power of the lens to be measured based on the displacement of the target 7 and the position of a target pattern image appearing on the light receiving element 11. Let f2 be a focal length of a projection lens 8, f3 a focal length of the image forming lens 10, 1 a distance from the optical axis L to a light source image to be formed in the vicinity of the back face (or side closer to the light source) of the lens 20 to be measured, 2 a displacement of the target 7 from its reference position, and h a distance from the optical axis L to the image on the light receiving surface of the light receiving element 11, then the power of the lens 20 to be measured can be expressed as $$S(D)=(h+Z\ rf3/f22)1000/rf3 \tag{15}$$

However, at least three light sources are actually needed to obtain all optical characteristics including S, C, A, P due to the presence of the decentration in mounting the lens 20 to be measured, cylindrical power C of the lens 20 to be measured prism power $_A$, etc.

First, the LED's 41a to 41c are by turns lit to find, through calculation, positions of pattern images of the target 7 arising from the LED's 41a to 41c and power at the visible light (660 nm) based on the target position.

Then, the positions of pattern images arising from the emission of light by the LED's 42a, 42b are detected. Due to the presence of only two light sources, it is impossible in this case to find the power of the lens 20 to be measured by use of near-infrared light (735 nm). Nevertheless, the prism power can be obtained by virtue of a single light source in the form of the LED 42a provided on the optical axis L.

Let coordinates of image centers by the LED's 41a to 41c and the LED's 42a and 42b be 41a(x1, y1), 42a(x2, y2), 43a(x3, x3,), 42a(x4, y4), 42b(x5, y5), respectively, then the prism power $_A$ at visible light correspond to the middle point {(x1+x3)/2, (y1+y3)/2} between (x1, y1) and (x3, y3).

Since the focal lengths f1, f2 and f3 at respective wavelengths are already known, with the same displacement Z, the height hi of image in the direction of y-axis by visible light is obtained by y2−(y1+y3)/2, while the height hi of image in the direction of y-axis by near-infrared light is obtained by y5−y4.

Thus the powers associated with respective wavelengths in the direction of one meridian coinciding with the y-axis are derived from the above expression (15) to find a difference in powers in the direction of one meridian. Although the powers in the directions of respective meridians differs depending on the nature of the lens 20 to be measured, dispersion in only one direction would be sufficient since the dispersion value is constant within the individual lens 20 to be measured. Based on the thus obtained dispersion value, the power of the lens 20 to be measured initially obtained by the visible light is corrected into a value associated with a desired wavelength and then displayed.

Since the above-described calculation is performed based on the positional relationship of images associated with respective light sources, the prism level upon lighting respective light sources differs during the time that the lens 20 to be measured is largely displaced by the measurer, which may result in a measurement error. Accordingly, the displacements of images by respective light sources must be constantly observed to find a dispersion value based on the positions of respective images at the point of time when the displacements of images come to a stop or become less than a certain degree, storing it within the storage means 27.

The dispersion correction value may be calculated and updated each time the image displacement comes to a stop. However, this will lead to a reduction of measurement speed because five light sources must be lit for each measurement even though the power can be originally calculated by merely lightening three light sources. Actually, the dispersion correction value remains constant during the measurement of the same lens 20 to be measured, and hence ordinarily, by lighting merely three light sources. Only the power by the visible light is calculated and corrected by a dispersion correction value being previously processed and stored, and displayed on the display means 28. Thus, only when the calculation result by the visible light has changed more than a certain value, the remaining two near-infrared light sources are allowed to be lit to calculate the dispersion correction value for updating.

When the measurer feels that the dispersion correction is necessary, the correction key of the input means 29 may be depressed to find a correction value for dispersion value to thereby perform update and storage.

Providing that the dispersion value of the lens 20 to be measured is already known, the correction key 29d may be again depressed to stop the calculation of the dispersion correction value, and the dispersion value may be input through the letter key 29a.

Immediately after the main switch of the lens-meter 1C has been turned on or after the clear key has been depressed, a most typical dispersion value remains stored in advance until the measurer inputs a command of dispersion correction through the correction key 29d. Based on this value, the measurement value by the visible light may be corrected for the display.

Figure 18:
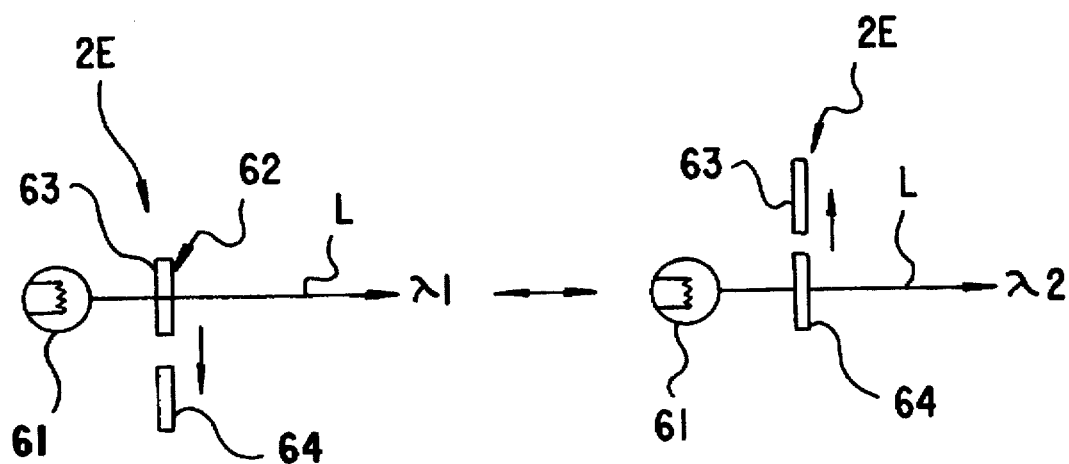
FIG. 18 depicts an arrangement of a measurement light source using a filter section.

A still further embodiment of the measurement light source 2 will be described with reference to FIGS. 18 and 19.

A measurement light source 2E comprises a light emitting source 61 including a tungsten lamp or a halogen lamp facing the optical axis L, and a filter section 62 interposed between the light emitting source 61 and the objective lens 6.

The filter sections 62 includes a first filter 63 transmitting 660 nm light, and a second filter 64 transmitting 735 nm light, and is driven by a slide driving means not shown so as to cause either the first filter 63 or the second filter 64 to confront the optical path L, thereby directing the light from the light emitting source 61 with measurement wavelength $\lambda 1$ or $\lambda 2$ toward the lens 20 to be measured.

Figure 19:
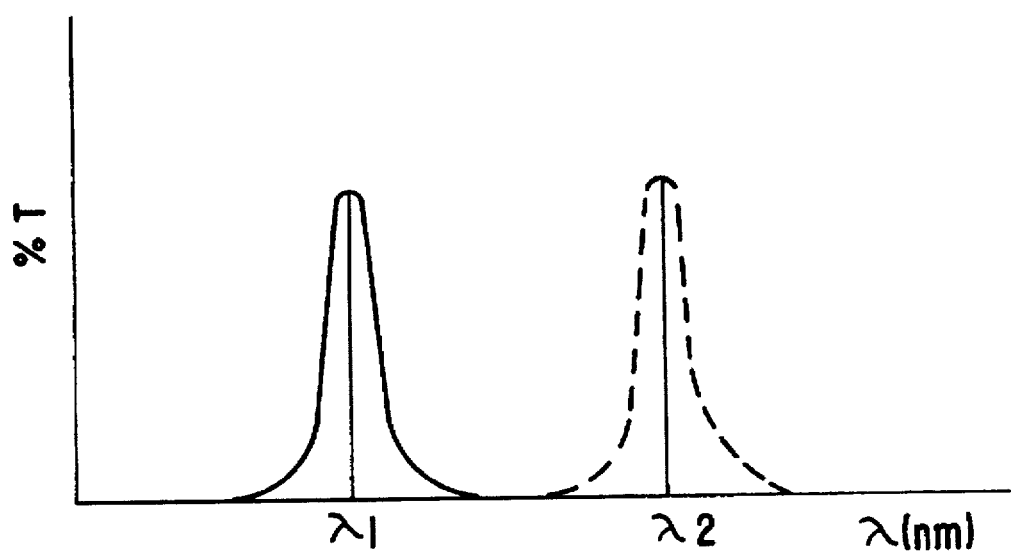
FIG. 19 is a characteristic diagram showing transmittance of the filter section shown in FIG. 18.

FIG. 19 illustrates light transmittance (%T) of the first filter 63 and second filter 64. The use of this measurement light source 2E enables a luminous flux for measurement with two different wavelengths consisting of measurement wavelengths $\lambda 1$ and $\lambda 2$ to be obtained by a simple structure having only a single light emitting source 61.

A still further embodiment of the measurement light source 2 will be described with reference to FIG. 20.

Figure 20A:
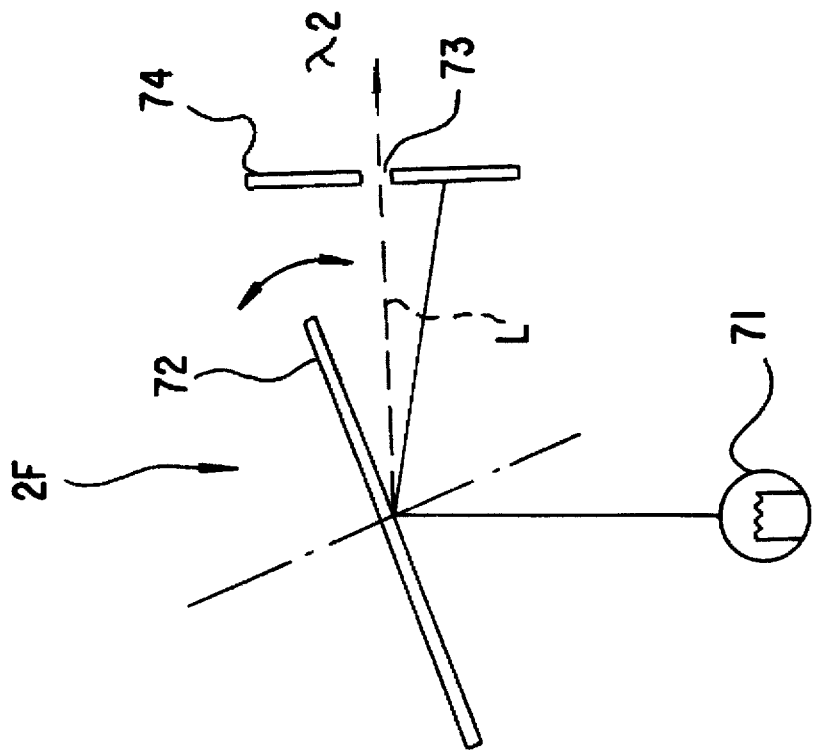
FIG. 20 depicts an arrangement of a measurement light source using a diffraction grating.
Figure 20B:
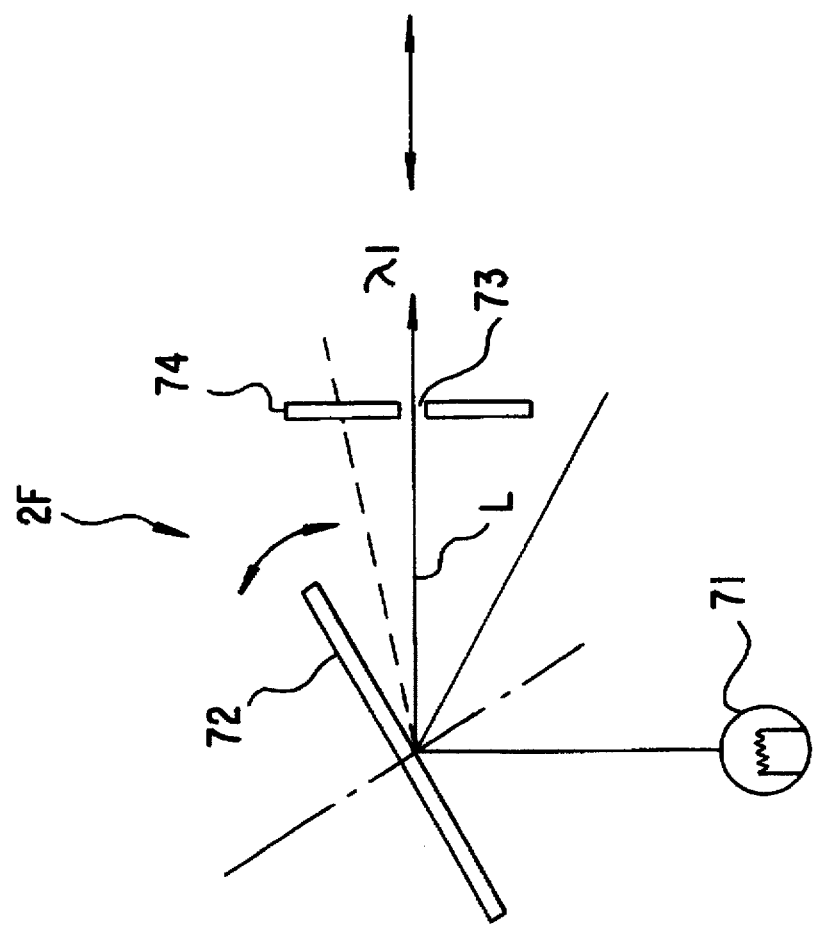

A measurement light source 2F as shown in FIG. 20 comprises a light emitting source 71 including a tungsten lamp, halogen lamp, or xenon lamp facing the optical axis L, a rotatable reflection-type diffraction grating 72 which diffracts light from the light emitting source 71 toward the optical axis L, and a pin hole plate 74 having a pin hole 73 at its center facing the optical axis L.

According to this measurement light source 2F, there can be obtained a luminous flux for measurement with at least two different wavelengths consisting of the measurement wavelengths $\lambda 1$ and $\lambda 2$ by a single construction using the single light emitting source 71 and appropriately rotating the diffraction grating 73. Besides, the diffraction grating may be used to change the wavelength at finer steps to see the outputs of the photoelectric conversion means 11 for respective wavelengths, thereby making it possible to measure the optical characteristics such as transmittance of the lens 20 to be measured and the like, the presence or absence of coating for blocking ultraviolet rays, and transmittance of sunglasses. Some Humphrey's lens-meters are capable of measuring the transmittance, in which different optical systems are possibly employed for the measurement of the power and the measurement of the transmittance. The diffraction grating 72 can be a transmission type besides the reflection type, or may be substituted by a prism.

Description will next be given of a specific constitution of the lens-meter 1 and the measurement of a progressive focal lens 80.

Figure 22:
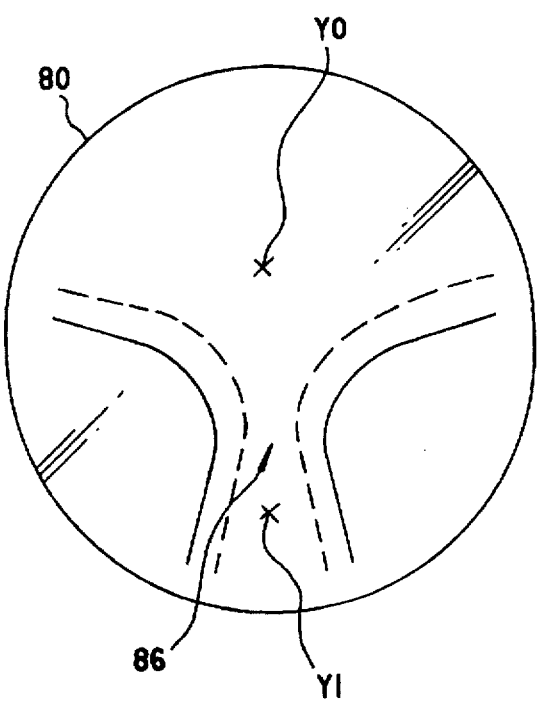
FIG. 22 is a top plan view of a progressive focal lens.

A method of measuring the progressive focal lens 80 comprises the steps of measuring a region containing a distance portion Y0 (upper half region of the progressive focal lens 80 as shown in FIG. 22 and having right and left prism values nearly equal to 0) on a normal measurement mode, depressing the addition power key 29c to change the screen of the display means 28 into nearsighted measurement mode (wine-glass-like display), displacing the progressive focal lens 80 along the region supposed to be a progressive zone 86 according to this display, and measuring the near portion Y1.

Another method of measuring the progressive focal lens 80 comprises the steps of depressing the measurement mode setting key 29b to switch into progressive measurement mode, measuring the region containing the distance portion Y0 based on the screen display of the display means 28, then depressing the addition power key 29c or recognizing the completion of the measurement of the distance portion Y0 to automatically switch into nearsighted measurement mode, and measuring the near portion Y1 in the same manner as the above.

Figure 21:
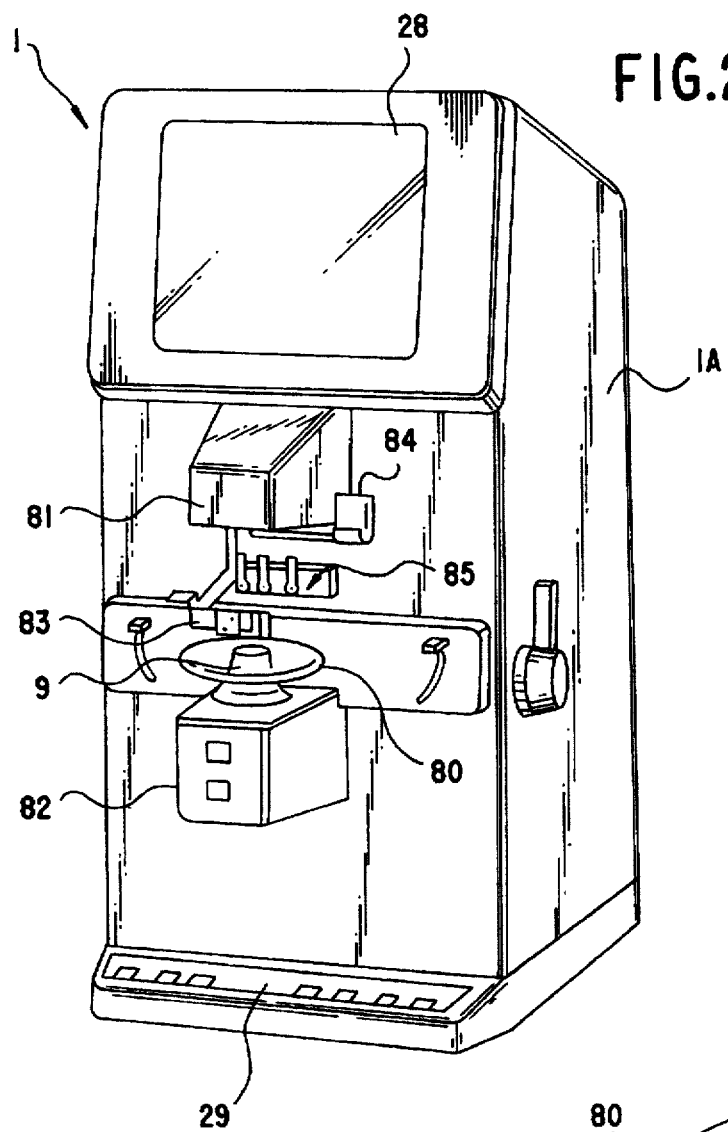
FIG. 21 is a perspective view of a specific constitution of the lens-meter shown in FIG. 1.

The lens-meter 1 shown in FIG. 21 comprises a box-like body 1A having a front surface, a display means 28 provided on the front surface at its upper portion, and an upper support box 81 and a lower support box 82 each mounted with the optical system and located below the display means 28 on the front surface, the lower support box 82 confronting the upper support box 81 at a predetermined interval and having on its body 1A having a front surface, a display means 28 provided on the front surface at its upper portion, and an upper support box 81 and a lower support box 82 each mounted with the optical system and located below the display means 28 on the front surface, the lower support box 82 confronting the upper support box 81 at a predetermined interval and having on its top lens mount 9 for receiving the progressive focal lens 80 against the lens mount 9, and a marking mechanism 85 which is located in the vicinity of the lens presser 83 and is adapted to confer a mark on the progressive focal lens 80 by the operation of a lever 84. Moreover, the input means 29 is arranged on the front surface of the body 1A at its bottom.

The progressive focal lens 80, as shown in FIG. 22, includes the distance portion Y0, near portion Y1, and a progressive zone 86 in which addition power ADD is increased accordingly as approaching the near portion Y1 from the distance portion Y0.

Figure 23A:
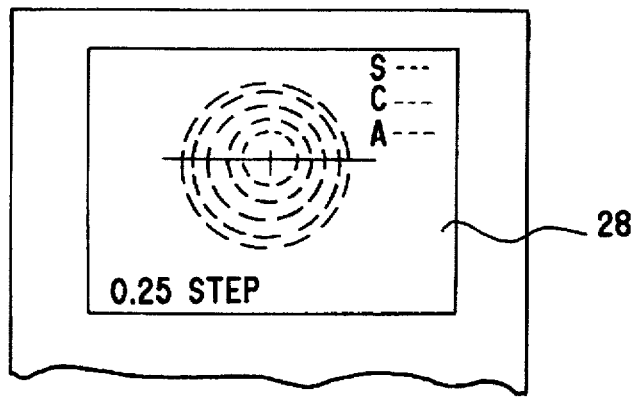
FIG. 23 is an explanatory diagram showing an example of display on a display means in the lens-meter shown in FIG. 21.
Figure 23B:
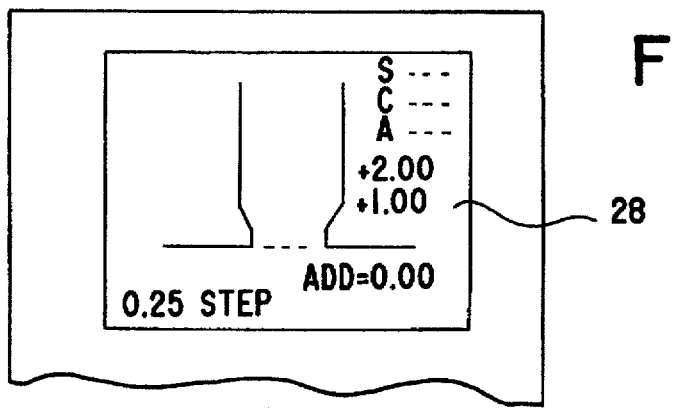
Figure 23C:
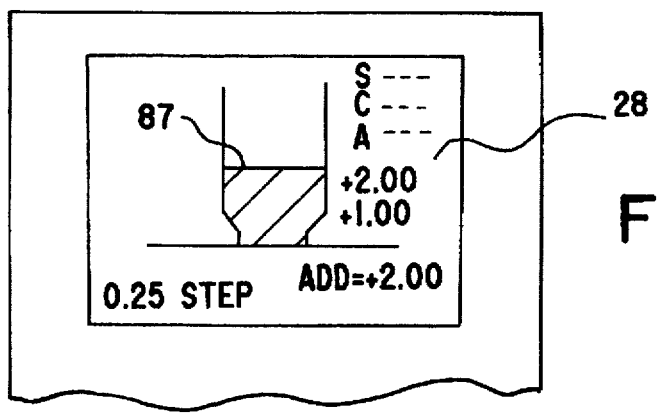

In the case of measuring the optical characteristics of such progressive focal lens 80 by use of the lens-meter 1, the progressive focal lens 80 is displaced while being pressed by the lens presser 83 on the lens mount 9 so that the distance portion Y0 is fixedly positioned at the center of the lens mount 9, thus measuring its optical characteristics in the same manner as the above. Based on this, the computing means 26 finds through calculation optical characteristics with correction of the distance portion Y0 in the same manner as the foregoing. As a result, on the screen of the display means 28 there appears addition power ADD=0 under the control of the CPU 22 as shown in FIG. 23, and the optical characteristics with correction of the distance portion Y0 are stored within the storage means 27. The progressive measurement mode is set by the measurement mode setting key 29b or the addition power key 29a. At that time, the screen of the display means 28, as shown in FIG. 23, is switched into a wine-glass display from the alignment display so far under the control of the CPU 22.

Afterwards, the progressive focal lens 80 is displaced along the progressive zone 86 while being pressed by the lens presser on the lens mount 9. Then, on the screen of the display means 28, a color bar 87 is raised accordingly as the addition power ADD is increased as shown in FIG. 23 under the control of the CPU 22. Eventually, based on the measurement result when the near portion Y1 is fixedly positioned at the center of the lens mount 9, addition power ADD=2, for example, appears on the screen of the display means 28 as shown in FIG. 23 under the control of the CPU 22, and the optical characteristics with correction of the distance portion Y0 are stored within the storage means 27.

The foregoing calculation for correction may be performed when storing the addition power ADD=2 of the progressive focal lens 80 within the storage means 27 with the support from the letter key 29a. In case upon measuring the distance portion Y0 and near portion Y1 the measurement results are quite different from each other or an accurate transition from the distance portion Y0 to the near portion Y1 is not accomplished, an alarm may be given by a buzzer or the like although not shown, which will heighten the accuracy of the measurement.

Since the progressive focal lens 80 remains fixed immediately before conferring a predetermined mark onto the progressive focal lens 80 by the marking mechanism 85, a microswitch not shown interlocked with the operation of the lever 84 of the axis marker 85 may be activated to execute the above measurement with respect to the progressive focal lens 80 based on the signal from the microswitch.

The present invention is applicable to a lens-meter fitted with Humphrey type optical system in addition to the above-described case.

What is claimed is:

1. A lens-meter in which light from a measurement light source is passed through a lens to be measured into a photoelectric conversion means so as to find optical characteristics of said lens to be measured based on photoelectric conversion signals from said photoelectric conversion means, said measurement light source being capable of emitting at least two rays of light having different wavelengths, said lens-meter comprising:

control means for controlling said measurement light source to emit said rays of light having different wavelengths in a time division manner;

input means for inputting a correction command signal at a point in time when displacements of images obtained by the rays of light are stopped; and computing means for calculating optical characteristics of said lens to be measured based on said photoelectric conversion signals from said photoelectric conversion means in response to the at least two rays of light having different wavelengths to find a correction value for a dispersion value when said commuting means is supplied with said correction command signal from said input means.

2. A lens-meter in which light from a measurement light source is passed through a progressive lens to be measured into a photoelectric conversion means so as to find optical characteristics of said progressive lens to be measured based on photoelectric conversion signals from said photoelectric conversion means and in which there is provided an addition power measurement key of said progressive lens, said measurement light source being capable of emitting a plurality of rays of light having different wavelengths in a time-division manner, said lens-meter comprising:

computing means for calculating optical characteristics of said progressive lens to find a correction value for a dispersion value in compliance with depression of said addition power measurement key at a point in time when displacements if images obtained by the rays of light are stopped after measurement of a distance portion of said progressive lens.

3. A lens-meter in which light from a measurement light source is passed through a lens to be measured into a photoelectric conversion means so as to find optical characteristics of said lens to be measured based on photoelectric conversion signals from said photoelectric a mark onto said lens to be measured, said measurement light source being capable of emitting a plurality of rays of light having different wavelengths in a time division manner, said lens-meter comprising:

computing means for calculating optical characteristics of said lens to find a correction value for a dispersion value in compliance with conferring of said mark onto said lens by said marking mechanism at a point in time when displacements of images obtained by the rays of light are stopped after the measurement of said lens.

* * * * *